WILLIAM H. HORTON
JAMES E. DIERKS
INVENTORS

ATTORNEYS

United States Patent Office 3,353,463
Patented Nov. 21, 1967

3,353,463
FLASH SOCKET ARRANGEMENT
William H. Horton and James E. Dierks, Rochester, N.Y., assignors to Eastman Kodak Company, Rochester, N.Y., a corporation of New Jersey
Filed July 12, 1965, Ser. No. 471,014
3 Claims. (Cl. 95—11)

ABSTRACT OF THE DISCLOSURE

A multilamp flash package socket arrangement having a drive mechanism for rotating the socket so as to sequentially present a fresh flash lamp for each exposure, the improvement of a door that covers the socket when the door is in a closed position and energizes the drive mechanism when the door is opened.

---

This invention relates to flash photography, and more particularly, to a socket arrangement in a photographic device to receive multilamp flash packages.

There have been developed flash packages containing a plurality of photoflash lamps and individual reflectors, disclosed, for example, in U.S. applications Ser. No. 417,913 and 417,914, now Patent No. 3,327,105, both filed Dec. 14, 1964. The present invention comprises a socket arrangement in a photographic device to receive such a package and door means to cover the socket arrangement when not in use. In the preferred embodiment, the door, when opened to permit insertion of a package, energizes or winds a drive mechanism which may then be used to index the socket and inserted package to place a fresh lamp in the circuit after each camera operation.

An important object of the invention resides, therefore, in the provision of a socket arrangement to receive a multilamp flash package and door means to cover the socket arrangement when not in use.

Another object of the present invention resides in the provision of drive means, energized by the door when opened to insert a lamp package, to index the socket and inserted package after each camera operation.

These and other objects and advantages will become more apparent in the course of the following description, the accompanying drawing forming a part thereof and wherein.

Figure 1:
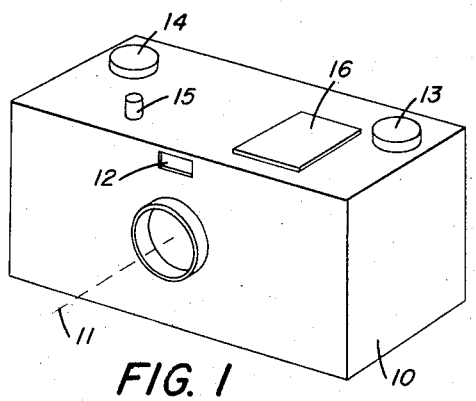
FIG. 1 is a perspective view of a photographic still camera including the present invention.

Referring to FIG. 1, a photographic still camera embodying the present invention suitably includes a light tight housing 10 having a picture taking axis 11 on which are mounted the usual exposure producing parts such as lens, shutter and a frame of roll film fed by supply-takeup spools controlled by winding knobs 13, 14. Also normally included are a viewfinder 12 and a camera operating button 15 which is depressed to take the exposure.

Figure 2:
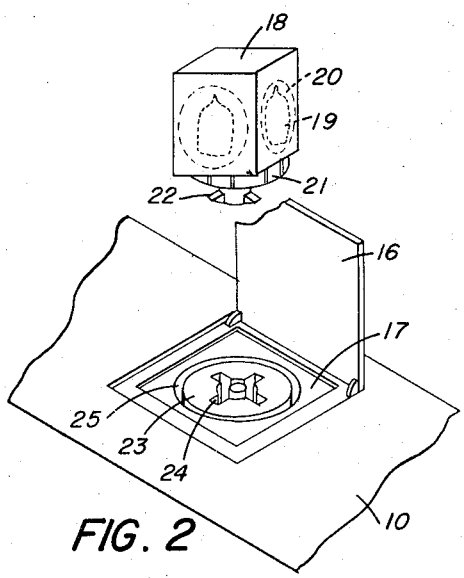
FIG. 2 is a partial view of the camera with the flash door opened to permit insertion of a multilamp package.

According to the present invention, there is provided a door 16 on the housing 10 which covers the multilamp flash receiving socket 17 shown in FIG. 2. A multilamp package which may be used with the present invention comprises as disclosed in U.S. applications Ser. No. 417,913 and 417,914, now Patent No. 3,327,105, a light transmitting enclosure 18, within which are mounted a plurality (four) of photoflash lamps 19 and individual reflectors 20. Each lamp includes a pair of lead-in wires which are wrapped around an annular contact ring, and a central connecting post 22 detachably connects the package to the receiving socket arrangement 17.

Receiving socket arrangement 17 comprises a rotatably mounted socket portion 23 defining a central access opening 24 for receiving and detachably retaining the connecting post 22 by suitable means, as for example, the retaining means disclosed in U.S. application Ser. No. 417,914, now Paatent No. 3,327,105. An annular groove 25 receives the contact ring 21 when the package is attached, and a pair of fixed terminals disposed at the groove 25 engage the lead-in wires of the forward facing lamp 19 to place the lamp in a known flash synchronizing circuit to fire the lamp 19 in timed relation with camera operation.

Figure 3:
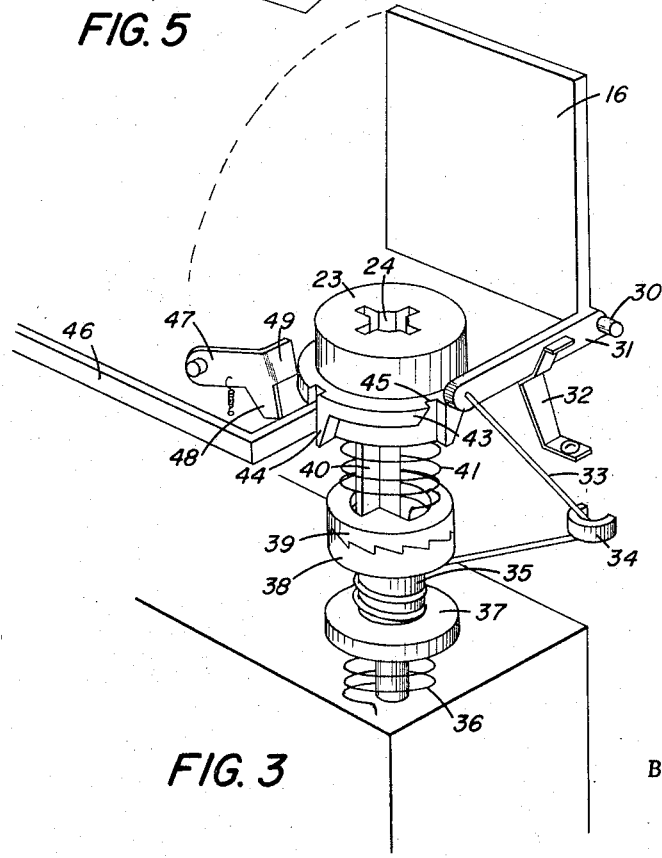
FIG. 3 is a perspective view of a preferred embodiment of the invention as included in the camera shown in FIG. 1.

As shown in FIGS. 2 and 3, the door 16 is pivotally mounted on housing 10 by hinges 30 and is held in the open position to uncover the receiving socket by engagement of an integral arm 31 with a resilient stop 32.

The drive mechanism, according to the invention, includes a flexible cable 33 attached at one end to arm 31 and passing around a guide 34 to a drum 35. The cable 33 is wrapped around drum 35 with its other end fixed thereto so that opening of door 16 to the position shown in FIG. 3 causes the drum 35 to be rotated in a clockwise direction (looking down).

A helical return spring 36 is attached at its lower end to the housing and at its upper end to head 37 of the drum. An upper head 38 of drum 35 and a ratchet member 39 engage each other by a cooperating ratchet on the interface, and a post 40 rotatably supported on a member 39 is fixed to the socket portion 23 for rotation therewith. A second helical drive spring 41 is fixed at one end to member 39 and at the other end to socket portion 23. As can be seen clockwise rotation (looking down) of drum 35 causes simultaneous clockwise rotation of member 39, and counterclockwise rotation of drum 35 relative to member 39 is permitted.

Positioning of the socket portion 23 is provided by control ring 43 which is integral with socket portion 23. Ring 43 defines four depending lugs 44 (corresponding in number to the number of lamp positions) and adjacent notches 45. Cooperating therewith are an indexing arm 46 and a locking lever 47 having a release tab 48 engaging arm 46 and a control tab 49. Arm 46 and tab 49 are selectively positionable in the notches 45 to prevent socket rotation. Arm 46 is a part of the camera release 15 and biased into the notches 45 for engagement with lugs 44, whereas lever 47 is biased downwardly by a weaker spring but is held in the position shown in FIG. 3 by engagement of release tab 48 with arm 46. As the camera release 15 is depressed to make an exposure, arm 46 moves downwardly to permit control tab 49 to be positioned in the path of rotation of lugs 44.

As the cover 16 is opened, the clockwise rotation of drum winds or tensions the return spring 36 and drive spring 41, which is possible because socket portion 23 is prevented from rotation by arm 46.

As an exposure is made by depressing button 15, arm 46 is lowered until it clears lug 44. Drive spring 41 then rotates socket portion a slight amount clockwise (looking down) until the same lug 44 is engaged by tab 49. When the exposure is completed and button 15 returned to its original position, arm 46 rises on the right side of the lug 44 and simultaneously lifts tab 49, thereby permitting socket portion 23 to be rotated by the drive spring 41 until the next subsequent lug 44 engages arm 46.

After three complete operations to index the package through all four lamp positions by the energy of drive spring 41, post 40, which is in the form of a blade, engages an eccentric stop on the member 39 to prevent further socket rotation. The lamp package may then be removed, and the door 16 closed by pushing to overcome the resilient stop 32. Tensioned return spring 36 then acts to wind cable 33 onto drum 35 and to pull the cover 16 closed. During the closing, member 39 is held stationary against post 40 by spring 41, and counterclockwise rotation of drum 35 is permitted because of the ratchet in the interface between member 39 and head 38.

Figure 5:
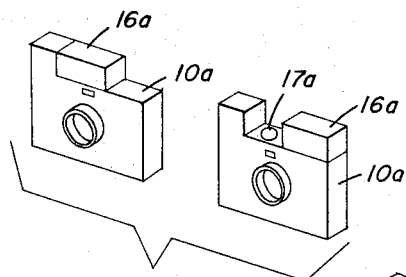
FIG. 5 shows a photographic camera in which the arrangement of FIG. 4 is incorporated into the camera design.
Figure 4:
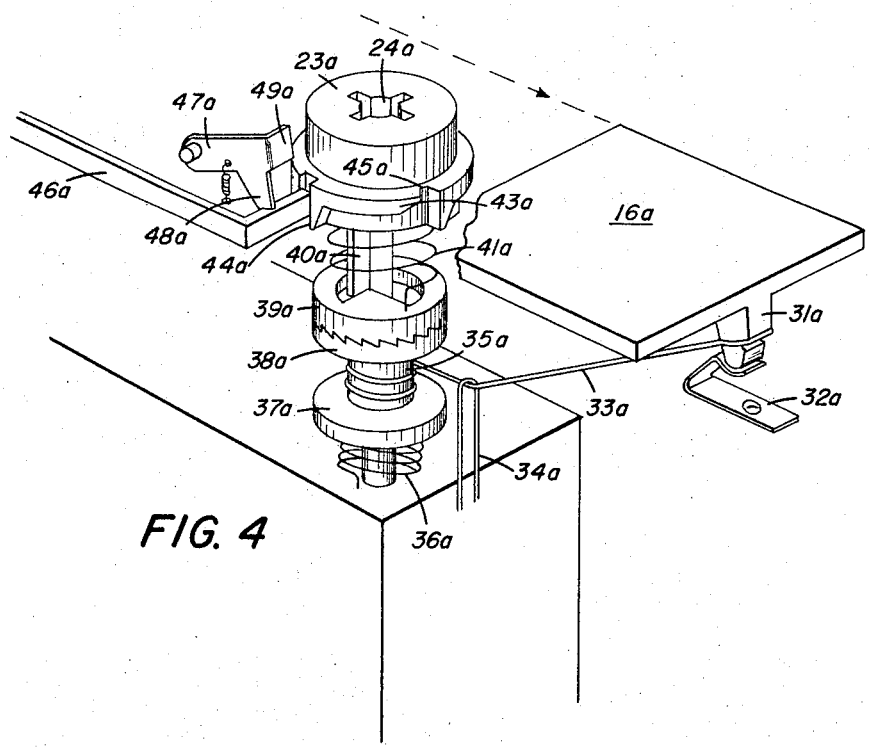
FIG. 4 is an alternate arrangement showing a sliding door used to cover the socket arrangement and to energize the drive means.

In the alternate arrangement shown in FIGS. 4 and 5, in which like parts are numbered with the letter "a," door 16a is mounted on the camera body 10a by suitable guides for lateral sliding movement to uncover the socket arrangement 17a whenever flash operation is desired. As in the embodiment of FIGS. 1 through 3, sliding of door 16a to the open position energizes a drive mechanism through cable 33a, and the door 16a is held in the open position by a resilient stop latch 32a.

With respect to both embodiments, it is clear that opening of the door to uncover the flash arrangement may be used to adjust a camera mechanism such as the shutter, for flash operation. In this connection, a suitable adjusting mechanism is disclosed in U.S. Reissue Patent No. Re. 25,766.

While this invention has been described with reference to particular embodiments, it is obvious that variations can be resorted to without departing from the spirit of the invention or the scope of the subjoined claims.

We claim:

1. In a photographic device, the combination comprising movable socket means to detachably receive a package containing a plurality of flash lamps, door means movable between a position covering the socket means and a position uncovering the socket means, drive means for selectively moving the socket means and received package to sequentially place the flash lamps in a flash circuit and means interconnecting the door means and the drive means to energize the drive means upon movement of the door means to one of its positions.

2. The combination according to claim 1 wherein the drive means includes a rotatable drum and spring means tensioned by rotation of the drum, and the interconnecting means comprises a cable connected at one end to the door means and at the other end to the drum.

3. The combination according to claim 1 and further comprising a return spring biasing the door means to the covering position, and stop means to hold the door means in the uncovering position.

References Cited

UNITED STATES PATENTS

| | | | |
|---|---|---|---|
| 2,485,404 | 10/1949 | Noel | 240—1.3 |
| 2,835,787 | 5/1958 | Mihalyi | 240—37 X |
| 3,228,286 | 1/1966 | Jarvis | 240—37.1 X |
| 3,244,087 | 4/1966 | Anderson et al. | 95—11 |
| 3,260,181 | 7/1966 | Hennig et al. | 95—11 |
| 3,263,068 | 7/1966 | Jakob | 240—1.3 |

JOHN M. HORAN, *Primary Examiner.*

NORTON ANSHER, *Examiner.*

FRED BRAUN, *Assistant Examiner.*